(12) United States Patent
Korenshtein

(10) Patent No.: US 6,567,838 B1
(45) Date of Patent: May 20, 2003

(54) METHOD, SYSTEM AND PROGRAM FOR EXECUTING A PREDICTED OPERATION IN A COMPUTER SYSTEM AFTER A PREDETERMINED PERIOD ELAPSES SINCE A USER ACTIVITY

(75) Inventor: Roni Korenshtein, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/091,110

(22) Filed: Jul. 13, 1993

(51) Int. Cl.⁷ .................................................. G06F 9/00
(52) U.S. Cl. .................... 709/100; 709/102; 709/103
(58) Field of Search ........................... 709/100, 101, 709/102, 103, 104, 105, 106, 107, 108

(56) References Cited

U.S. PATENT DOCUMENTS

| | | | |
|---|---|---|---|
| 4,931,935 A | 6/1990 | Ohira et al. | 364/419 |
| 5,128,672 A | 7/1992 | Kaehler et al. | 341/23 |
| 5,161,225 A | * 11/1992 | Abraham et al. | 395/600 |
| 5,390,281 A | * 2/1995 | Luciiu et al. | 395/12 |

OTHER PUBLICATIONS

Allen Cypher, Eager;Programming Repetitive Task By Example, CHI '91 , pp–33–39.*
Bryd A Myers, Invisible Programming, Visual Languages 1990 IEEE Workshop, pp 203–208.*
Darragh et al, The Reactive Keyboard; A Predictive Typing Hid, Computer Magazine, 11/90, V;23, issue 11, pp 41–49.*
Mischel, Jim, Cobol:Beyond Mainframes, Computer Language, Jul. 1990 V7 N7 p95(12).*
Fersko–Weiss, Henry, Leading Edge Word Processing, PC Magazine Feb. 29, 1988, V7 N4 p 160 (2).*
Davidson, Marc, Software:Bookmark, Maxi* Save , and SOS Lotus Nov. 1988 V4 N11 p100(2).*
Shaw, Richard Hale Brief ; Programmer's Editor Harnesses Os/z's Virtual Memory Capabilities, PC Magazine, Oct. 31, 1989 V8 N18 p44(1).*
TM Reid, Pre–Emptive Data Transmission, IBM Technical Bullentin vol 35, No. 1A, Jun. 1992, p. 365.
LE Gregg et al, Host Control of I/O Processor and Device Optimization, vol 32 No. 8A Jan. 1990, pp 104–107.

* cited by examiner

*Primary Examiner*—Majid A. Banankhah
(74) *Attorney, Agent, or Firm*—Marilyn Smith Dawkins; Romualdas Strimaitis

(57) ABSTRACT

Method and system for operating a computer system to execute a selected predicted operation which a user has not yet requested is described. The results of the predicted operation are stored with an uncommitted (temporary) status until the user actually requests the results of the predicted operation at which time the the status of the results are changed to a committed (permanent) status so that the results become usable by the user as though generated after the user requests the predicted operation. User activity which invalidates or renders the results of the predicted operation useless is tracked, so that the results will be discarded when appropriate. The selection of the predicted operation is made based on the particular activity being performed by the user at the time. A table of predicted operations may be used which prioritizes the predicted operations. The triggering event for the predicted operation cycle may be the expiration of a time period since the last user activity or some other event which indicates that there are excess CPU resources available for predicted operations.

32 Claims, 1 Drawing Sheet

METHOD, SYSTEM AND PROGRAM FOR EXECUTING A PREDICTED OPERATION IN A COMPUTER SYSTEM AFTER A PREDETERMINED PERIOD ELAPSES SINCE A USER ACTIVITY

TECHNICAL FIELD

The present invention relates to methods and systems in the field of interactive computer program applications and more particularly to methods and systems for performing anticipated or predictable tasks which have not been requested by an interactive user.

BACKGROUND OF THE INVENTION

An Interactive application can be defined as an application which provides the user with an environment that allows the user to interact with a computer system by using input devices (such as a keyboard and a mouse) to create objects (e.g. programs, documents, forms) and perform a variety of operations on these objects. An editor, for example, is usually an interactive application. The user interacts with the application to create, modify and save text. A spreadsheet is another example of an interactive application.

A typical interactive application usually operate in a simple cycle in which the application waits for a user input and then the application processes the user's input.

During this process the system's processor is typically idle for a substantial portion of the total elapsed time, waiting for the user input. The system "goes to work" only when ordered by the user.

It is an object of the invention disclosed below to describe a method whereby the application program takes advantage of that idle time and "goes to work" soon after the user shows down in his/her usage of the application, so that when the work is requested by the user, the application has already completed it is or is in the process of completing it, so the application's overall response time is greatly improved.

SUMMARY OF THE INVENTION

The invention is a method and system for operating a computer system to execute a selected predicted operation which a user has not yet requested. The results of the predicted operation are stored with an uncommitted (temporary) status until the user actually requests the results of the predicted operation at which time the status of the results are changed to a committed (permanent) status so that the results become usable by the user as though generated after the user requests the predicted operation. User activity which invalidates or renders the results of the predicted operation useless is tracked, so that the results will be discarded when appropriate. Other user activity which does not invalidate the predicted operations may cause the execution of the predicted operation to be temporarily suspended until the triggering event occurs again. The selection of the predicted operation is made based on the particular activity being performed by the user at the time. A table of predicted operations may be used which prioritizes the predicted operations. The table may contain a list of allowable predicted operations based on a status code for each allowable predicted operation and a priority code for each allowable predicted operation. The triggering event for the predicted operation cycle may be the expiration of a time period since the last user activity or some other event which indicates that there are excess CPU resources available for predicted operations. The decision as to which operations should be allowed to execute predictively and what priorities should be assigned may be made by the application's programmer or the user of the application.

DETAILED DESCRIPTION OF THE INVENTION

Figure 1:
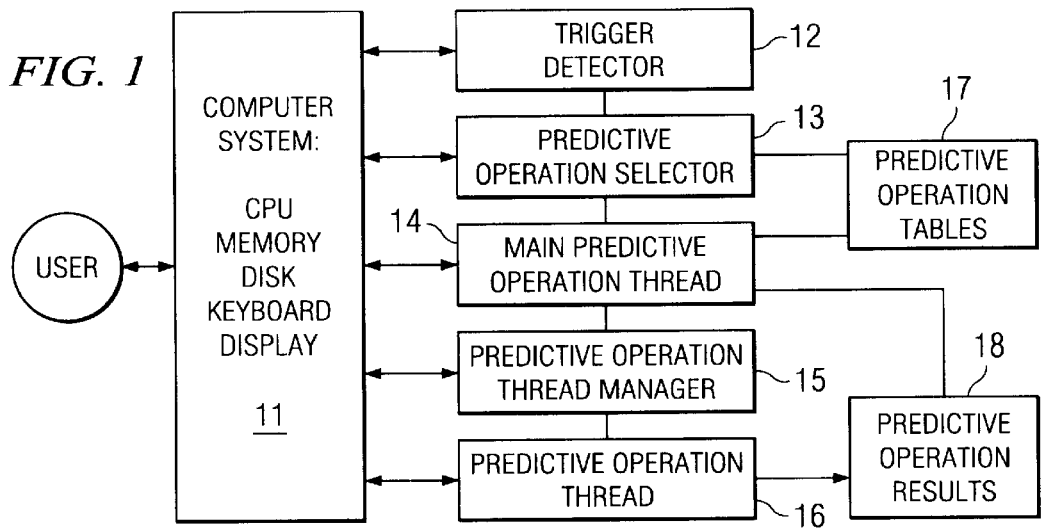
FIG. 1 is an overview of the major components of a system for performing predicted operations.

Predictive Logic as used herein is defined as an interactive application's anticipation of what operations it may be requested by the user to do, and its decisions of when and how to execute these operations in a way that the overall responsiveness of the system is improved.

A Predictive Operation as used herein is defined as an operation which is likely to be requested by the user at some point in the future. For example, in an editor, as soon as the user makes some changes to the text, it is very likely that a save operation will be requested at some point.

This implementation of Predictive Logic in interactive applications allows Predictive Operations to be executed when the application is otherwise idle, shortening the operation's response time dramatically, when the user eventually requests these operations from the system. The improvement is due to the fact that the system has already been working on the operation in anticipation of the request, and may have even completed the work requested.

As described above, an interactive application usually operates in a cycle in which the application waits for a user input and then the application processes the user's input. The system's processor is idle when waiting for the user's input.

This idle time can be used to perform operations that the user is most likely to request at some point, or even operations that the user just may request at some point. A user may be editing a file. When the user is pausing to think, the system can start saving the file. If the user decides at this point to save the file, the system already has a head start, so the save operation appears to take less time. If the user makes additional changes, the saved file will not be used, but since the system was using otherwise unused time to perform the operation there is no impact on the system's performance. Thus, if the Predictive Logic correctly predicts the requested action, there is an efficiency gain while there is no penalty for predicting incorrectly.

Either the system or the user should identify a set of operations, as Predictive Operations. Whenever the user does not respond for some specified period of time, the system initiates execution of these operations in some prioritized order, in sequence, or in parallel. When the user subsequently requests any of these operations, the system will respond immediately if it has already completed the operation, or it may just respond in less time than normally if the requested operation has started but not completed yet.

In the worst case, the operation would take as long as it takes with no predictive logic. This is the case when thee is no idle time between the time the user enters the last change and the user's request of the predictive operation, i.e., when the system does not get a change to even begin the operation before it is requested to do it.

For example, suppose an application identifies a compile process and a link process as the system predictive operations. Assume that the user creates four files and is then interrupted when someone walks into his/her office. The predictive logic detects, using the system timer, that the user has not interacted with the system for a predetermined amount of time, and, therefore, initiates the selected compile operation. The compile process compiles the four files, and may display the results, or it may just store the results and display them later on, when the operation is requested by the user. When the compile process finishes, the system picks up the next highest priority predictive operation (in this scenario the linking process, for example) and initiates it. Suppose that while the link operation is in progress the user resumes his/her work. The system detects it and immediately suspends the link process. Now the user modifies one of the four files and goes to lunch. After some time has elapsed with no user interaction, the system detects that it is idle again, the predictive logic assumes control and rather than resulting the suspended link operation, it aborts it, (because the logic for file modification changes the status of the predictive link operation to mean ABORT). If the user had requested an operation which does not cause the link process to abort, such as browse, then the predictive logic, rather than aborting the link process would have just resumed it. So now the predictive logic starts the compile process, to just compile the newly modified file. It is true that this file may have been compiled before for no reason. The rationale is that since nothing was going on when the first compilation took place, and the processor would have otherwise been idle, no harm was done, and no resources were wasted. When the compilation is finished, the predictive compile thread sets the status of the predictive link operation to indicate that the linker "Has_some_work_to_do". This causes the predictive logic to start the predictive link operation and it finishes. Now the user comes back from lunch and requests that the four file be compiled and linked. Since the system has already done that, it immediately presents the results to the user.

Although the invention will work in standard programming environments, to utilize the invention to maximum benefit, all lengthy operations which are designated as Predictive Operations should be constructed so that they are incremental. In other words, the system maintains a list of work items that need to be done for each predictive operation. So that the operation can work on each item independently. For example, a list of changed objects can be maintained. Whenever the predictive same operation is invoked it operates on this list and saves as much as it can until it is suspended due to some user interaction. So all the objects that have not been saved will be saved when the predictive save's operation is resumed.

This is not a requirement for using the predictive logic method described by this invention, but it will make it much more efficient and transparent. An editor, for example, may have a non-incremental save operation. Whenever the system is idle the predictive save tries to save all the changes. If now the user makes more changes, the work done so far is wasted and when the save is requested it would need to start from scratch. However, it at some point while the save is executing, it is interrupted due to a user requested save, then the save operation, already having a head start, would just have to finish up the work.

It is also desirable that the user be able to control the predictive logic and turn if off under some circumstances, for example, if other applications that are concurrently running on the same system, are slowed down noticeably as a result of the predictive logic.

Some Predictive operations will require that there be a mechanism in place for roll-back of the operation if the user does not request the operation. For example, a predictive save operation needs to be distinguished from a user requested save, so that if the user quits without saving, the changes made since the last user requested save are discarded, despite the fact that the predictive save, temporarily saved these changes. In other words, the results of the predictive operations may be temporary and they are committed to the session only when explicitly requested by the user.

One way to implement this is to save the incremental changes in a temporary file and when the save operation is requested, the changes are moved from the temporary file to the main session. This might be done using pointers or renaming so that the data is not actually moved. If the user does not request a save operation, the changes never make it to the main session file.

FIG. 1 illustrates a system embodying the invention. The standard components of typical computer system are used 11. The Trigger Detector 12 detects whatever event is used as the basis for starting Predictive Logic process. This may be a timer task which detects the passing a certain time with no user activity. Once the Trigger Detector signals that the event has occurred, the Predictive Operation Selector 13 is responsible for selecting which operation can appropriately be performed in the current context. The Predictive Operation Selector uses the Predictive Operation Tables 17 in making the decision. The Main Predictive Operation Thread 14 acts to coordinate the activities of the other components and is responsible for deciding when the Predictive Operation Results 18 can be committed. The Predictive Operation Thread Manager 15 starts and suspends the execution of the Predictive Operation Thread which is the particular operation that was selected by the Predictive Operation Selector. The Predictive Operation Results 18 are produced by the Predictive Operation Thread and are then committed or discarded as required by the Main Predictive Operation Thread.

Figure 2:
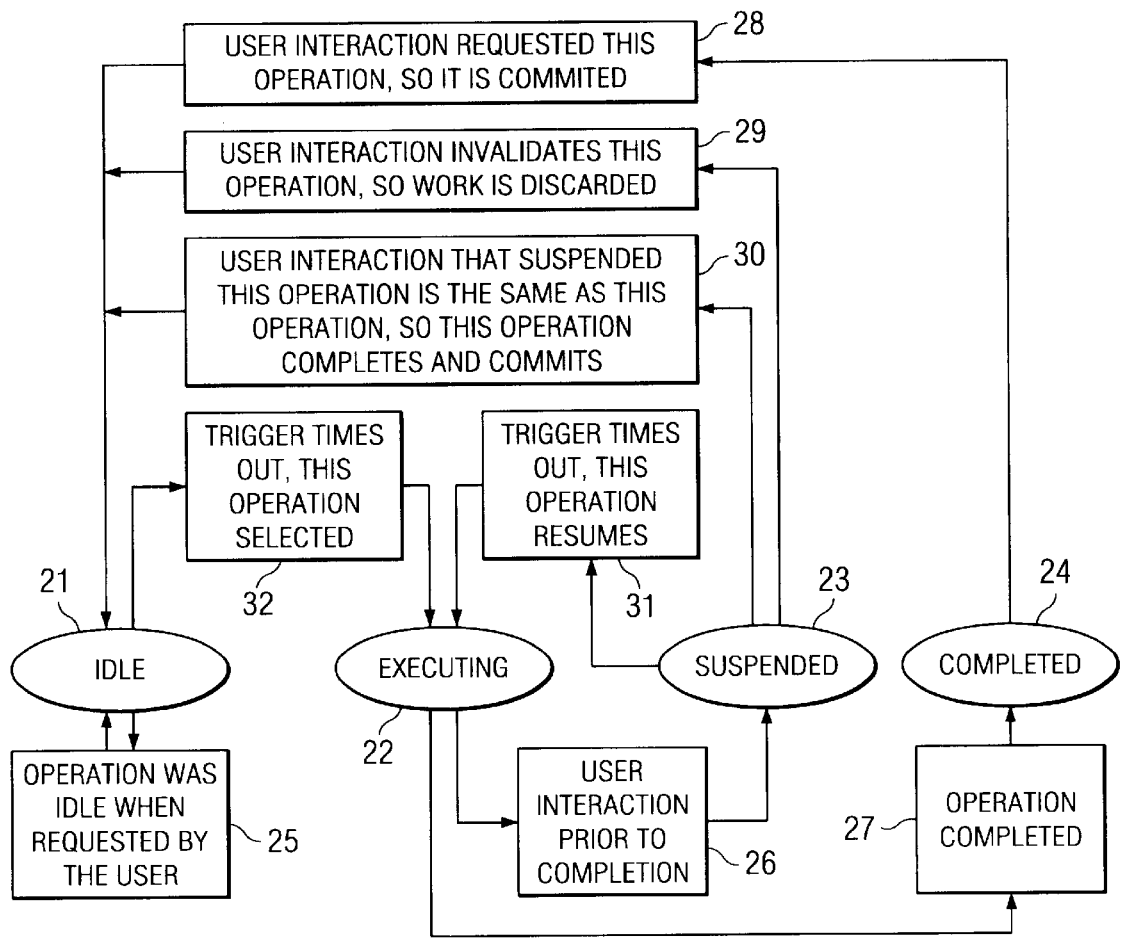
FIG. 2 is an overview of the process of tracking the status of predicted operations.

FIG. 2 illustrates an embodiment of the process for a selected a predictive Operation. The four states of the Operation are IDLE 21, EXECUTING 22, SUSPENDED 23 and COMPLETED 24. When the triggering event occurs the thread for the Operation is started and the status is set to executing 32. User interaction during the executing phase will result in the status of the Operation being set to SUSPENDED 23. From the SUSPENDED state the Operation may be resumed when the Trigger occurs again 31. However, if the user enters commands or data which invalidate the Operation, then Operation is stopped and the result if any is discarded 29. The user's interaction may be a request for the Predictive Operation that is already partially completed. In this case the Operation is simply allowed to complete the results are committed 30. From the EXECUTING state the Operation goes to COMPLETED when finished 27. The results are only committed when the user actually requests the Operation 28.

The detailed embodiment of the invention uses a Predictive Logic Trigger and a Predictive Operations Table. The Predictive Logic Trigger contains units of time. It specifies how much idle time is to elapse before the predictive logic takes over. For example, if it is set to 2 seconds it means that if the application is waiting for some user interaction, and if none is received in 2 seconds the predictive operations start executing. In some systems it may be possible to use zero for the waiting time which would imply that that the system would be always looking for Predictive Operations to be performed. Other embodiments could use alternate triggers. For example, if the computer system has sufficient processing power, a measure of CPU load could be used to trigger Predictive Operations. When the load on the CPU falls below a specified point, that would imply that the CPU has excess capacity at the moment that could be used for the Predictive Operations.

The Predictive Operations Table contains rows of the following information:
1. A predictive operation, such as Save, Export, Compile...
2. Its priority (The table may be kept in priority order, such that the top element is always the one having the highest priority, or all may have the same priority).
3. Its associated thread, i.e., executable unit.
4. Other information related to the operation and the implementation, such as whether the operation is suspended, idle/finished, has work to do, or needs to be aborted.

During the invocation and initialization of the interactive application, the Predictive Logic Trigger, and the Predictive Operations Table must be initialized, and a thread for each of the predictive operations, as well as the Main_Predictive_Logic thread, should be started. (The Thread's logic is described in the next section).

Also, in a central place where the user is prompted for input, such as in the main window procedure of an OS/2 Presentation Manager (PM) application, the following logic is needed. Whenever a message is received as a side effect of a user's non-passive request (some messages may be considered passive actions such as mouse movements or sizing windows, etc.), a message needs to be seen to the main_predictive_logic thread, informing it of the user request that has just come in. That thread will either suspend or about the currently executing predictive operation (if any) or it will restart the timer (which after so many units of time elapse, starts executing predictive operations).

When the user's request is completed, status of the predictive operations should be updated as a result of the last action. Different actions may affect the predictive operations in different ways. So as a result of the user adding a new object to the environment, the predictive save operation may be flagged as "having_some_work_to_do". But if the user's next action is to delete all objects from the environment, then the save operation needs to be aborted if it is in suspended mode, or its status needs to be changed to something like having_no_work if it has not been given a chance to start yet. Also the timer needs to be restarted, to again clock the current idle time.

The Main_Predictive_Logic Thread

Every predictive operation may have a thread of its own. In addition to the predictive operations threads, there is the main_predictive_logic thread. That thread controls the execution of the predictive operations threads based on the clock and the user requests.

The main_predictive_logic thread contains the following logic:
Start a timer thread which will return after n units of time have elapsed (the Predictive Logic Trigger contains n).
Wait for a message representing a user request.
If the timer has returned before a user message is sent it means that the user has not responded in a while, i.e., this is idle time. So the predictive operations are started (or resumed)
If a user action message has arrived, there are 2 cases:
If the timer is still clocking the time difference since the last user request, and currently there are no predictive operations executing, then just restart the timer.
If some predictive operations are executing then, depending on the choice of implementation, the predictive operations that are currently executing are either;
1) Allowed to complete, in which case handling of the user's most recent request will be delayed, or
2) Continued to some stopping point, from which it can be resumed, or
3) Suspended, and after processing the user's request, either restarted ore resumed, depending upon the effect of the last operation on the results of the suspended predictive operation, or
4) Aborted.

The Predictive Operations Threads

Each of the predictive operations threads contains logic to start its operation. It should execute until it is suspended or aborted due to incoming user requests. The work that it needs to do may be known to it globally, or may be communicated to it via some inter-process communication method such as a shared memory area, in which a list of work items may be kept. It may change the status of other predictive operations when it either starts or finishes its operation. For example, when a predictive compile thread finishes it may be set the status of the predictive "link" to represent "has_some_work_to_do".

The following abbreviations will be used:
PO stands for Predictive Operation.
POT stands for Predictive Operation Table.
PL stands for Predictive Logic.
PLT stands for the Predictive Logic Trigger. (This is a constant representing units of time).
The POT contains an entry for each predictive operation. The entry information contains at least the following information
1. Thread information for this PO.
2. Status of the PO.
The Status field of each entry is always in one of the following states: IDLE, EXECUTING, SUSPENDED, COMPLETED.
The status of the PO changes is depicted in the state transition diagram in FIG. 2.
Components and Logic
Conceptually the following components are required:
Main_Loop—This component is a loop waiting for a user interaction and executing user requests.
PL_Timer—This is a timer that triggers the POs. It is requested to clock user inactivities. It is reset whenever the user interacts with the system. It trigger a PO if the user does not interact with the system for more than PLT units of time.
PO_thread—There is one of these for each PO. When this thread is executing it does its work. Its PL responsibility is to set its status field in the POT to COMPLETED when it completes it work.
PL_TIMER LOGIC
This component responds to 2 messages and it generates one event in Object Oriented (OO) terms.
Messages:
Start—when this message is received it start/restarts timing.
Stop—when this message is received it stop the timer.
Events:
Timeout—generated when PLT time has elapsed since the start message has been received (indicating no user activity for at least PLT units of time).
When the Timeout event occurs the following logic is executed:
TIMEOUT LOGIC
It there is a PO in the POT whose status is SUSPENDED then change the status of the PO to EXECUTING and resume the PO_thread else
select the next PO to execute, change its status from IDLE to EXECUTING and start its PL_Thread. (This operation may also check to see if the PO has any work that it needs to do).

MAIN_LOOP LOGIC

Initialize the POT (all entires' status initialized to IDLE)
PL_Timer.start()

```
//standard interactive application loop
loop: wait for a user command
    //user interaction received as THIS_OPERATION.
    PL_Timer.stop( )              //stop the PL_Timer
    call process_user_command( )  //see below
    PL_Timer.start( )             //restart the PL_Timer
    end of loop
end of main_loop logic
```

PROCESS_USER_COMMAND LOGIC

If there is a PO thread currently executing (its status is EXECUTING) suspend it and set its status in the POT to SUSPENDED

```
If THIS_OPERATION is a PO
    switch status of THIS_OPERATION in the POT
        case SUSPENDED: //the operation started before the user
                        //requested it but was interrupted by a user
                        //interaction
            resume the operation
            wait for it to complete and commit
            change the operation's status to IDLE
        case COMPLETED: //the operation started and completed
                        //before it was requested by the user
            commit the operation
            change the operation's status to IDLE
        case IDLE: //the operation hasn't been started
            perform the operation and commit
end of switch
``` else//this operation is not a PO perform the operation
  if THIS_OPERATION invalidates the work that was done by the currently suspended PO (if there is one) then set that suspended PO's status to IDLE (discarding the work that was done).
end of process_user_command NOTE: The commit operation is simple and faster than the actual operation for example if the user is editing file X, a PO save operation may save into a temp file Y and the commit operation simply erases the old X and renames Y to X.

PL_THREAD LOGIC

Call the function which performs the work for which this PO is responsible.

Set the status field of this PO in the POT to COMPLETED.

EXAMPLE, SCENARIOS AND DATA FLOW

One example of an embodiment of the invention is to implement a Predictive logic Save operation in an editor. For simplicity, assume the Save is the only predictive operation and assume the PLT is set to 10 seconds meaning if the user does not do anything in 10 seconds the predictive save operation is triggered. Assume also that the predictive save operation operates on the whole file (rather than only saving changes).

1) Initialization

| user | Main_Loop | PL_Timer | Save PO_thread | comments |
|---|---|---|---|---|
|  |  |  |  | The user invokes the program |
|  |  |  |  | Main_Loop initializes POT |
|  | start |  |  | (Save's status = IDLE) |
|  | ---> |  |  | Main_Loop starts PL_Timer |
| Load X |  |  |  | (The timer starts ticking) |
| ---> |  |  |  | The user loads in file X |

2) A User interaction when no PO's active

| user | Main_Loop | PL_Timer | Save PO_thread | comments |
|---|---|---|---|---|
| type a char |  |  |  |  |
| ---> |  |  |  | The user types a char. |
|  |  | stop |  |  |
|  |  | ---> |  | The PL_Timer is stopped |
|  |  |  |  | No thread is executing . . . |
|  |  |  |  | char is processed |
|  |  | start |  |  |
|  |  | ---> |  | The PL_Timer is restarted |

3) PO begin and completes and then requested by user

| user | Main_Loop | PL_Timer | Save PO_thread | comments |
|---|---|---|---|---|
|  |  |  |  | No user act. for more than 10 seconds |
|  |  |  |  | PL_Timer times out. The save operation is selected. Save's status changed to EXECUTING |
|  |  |  | starts |  |
|  |  |  | ---> | The save operation is started. |
|  |  |  |  | The save operation saves in file Y and ends. Save's status is changed to COMPLETED. |
| Save |  |  |  | The user enters the Save command. |
| ---> |  |  |  |  |
|  |  | stop |  |  |
|  |  | ---> |  | The PL_Timer is stopped |
|  |  |  |  | Commit operation is performed i.e. X is deleted, Y is renamed to X. Save's status is changed to IDLE. |
|  |  | start |  |  |
|  |  | ---> |  | The PL_Timer is restarted |

4) PO begins and requested before it completes

| user | Main_Loop | PL_Timer | Save PO_thread | comments |
|---|---|---|---|---|
| | | | | The user thinks for more than 10 seconds PL_Timer times out. The save operation is selected. Save's status changed to EXECUTING |
| | | starts ---> | | The save operation is started. While Saving into file Y the user enters the Save command. |
| Save ---> | | | | |
| | stop ---> | | | The PL_Timer is stopped The save operation is suspended and Save's status is changed to SUSPENDED |
| | suspend ---> | | | |
| | resume ---> | | | Realizing that Save was requested Save is resumed The save operation completes saving in file Y. Save's status is changed to COMPLETED. Commit operation is performed i.e. X is deleted, Y is renamed to X. Save's status is changed to IDLE. |
| | start ---> | | | The PL_Timer is restarted |

5) A user interaction which invalidates an executing PO's work

| user | Main_Loop | PL_Timer | Save PO_thread | comments |
|---|---|---|---|---|
| type a char ---> | | | | The user types a char. |
| | stop ---> | | | The PL_Timer is stopped No thread is executing . . . char is processed |
| | start ---> | | | The PL_Timer is restarted The user thinks more than 10 seconds PL_Timer times out. The save operation is selected. Save's status changed to EXECUTING |
| | | starts ---> | | The save operation is started While saving the user types a char. |
| type a char ---> | | | | |
| | stop ---> | | | The PL_Timer is stopped |
| | suspend ---> | | | The save operation is suspended and Save's status is changed to SUSPENDED Since the char invalidated the Save's work, Save's status is changed to IDLE. char is processed |
| | start ---> | | | The PL_Timer is restarted |
| Save ---> | | | | The user enters the Save command. |
| | stop ---> | | | The PL_Timer is stopped Commit operation is performed i.e. X is deleted, Y is renamed to X. Save's status is changed to IDLE. |
| | start ---> | | | The PL_Timer is restarted |

6) User interaction while a PO is active which doesn't affect PO's work

| user | Main_Loop | PL_Timer | Save PO_thread | comments |
|---|---|---|---|---|
| | | | | The user thinks more than 10 seconds PL_Timer times out. The save operation is selected. Save's status changed to EXECUTING |
| | | starts ---> | | The save operation is started While saving the user enters a Show command |
| Show ---> | | | | |
| | stop ---> | | | The PL_Timer is stopped The save operation is suspended and Save's status is changed to SUSPENDED The Show command is processed The Show command does not affect Save's work. |
| | suspend ---> | | | |
| | start ---> | | | The PL_Timer is restarted The user thinks more than 10 seconds PL_Timer times out. The save operation is selected. Save's status is changed to EXECUTING |
| | resume ---> | | | The save operation is resumed The save operation ends |

-continued

| user | Main_Loop | PL_Timer | Save PO_thread | comments |
|------|-----------|----------|----------------|----------|
|      |           |          |                | after saving in file Y. Save's status is changed to COMPLETED. |

EXAMPLE OF POT UPDATING

The POT shown is for an application which allows the user to edit files to create some code. The user may save, compile and link the code and these operations are implemented as predictive operations.

The Environment of the scenario

The user is working on file "A.C." Typically changes are made to the source file (A.C.), the file is saved, compiled into A.OBJ, and then linked to produce the final executable A.EXE which then gets tested. When changes have to be made, the cycle repeats until done. At the time the scenario begins there already exist A.C., A.OBJ and A.EXE.

The Scenario

The table state transition described below reflects the following scenario:

The user modifies the source file A.C. and takes a break which allows some predictive logic to be executed. While the predictive logic is executing the user makes additional changes which invalidate all the predictive work.

The user manually saves the changes and takes another break which allows predictive logic to execute. The user now returns to work and requests compilation of A.C. followed by a link.

The Table

As described above, the POT contains an entry for each predictive operation. The entry information contains at least the following information 1) Thread information for this PO. 2) Status of the PO.

In the example POT below, the following information is kept for each PO entry in the POT:

1) Thread ID which is obtained when the thread is started, and is used to suspend, resume and abort the thread.

2) The Status field of each PO is always in one of the following states IDLE, EXECUTING, SUSPENDED, COMPLETED.

The PO entries in the POT table are in the PL order that they should execute, i.e., first PO will run if it has any work to do, followed by the PO in the second entry, etc.

When the Edit session for any file X.c is saved via PL it is saved as X.sav. When the save operation is committed, the file X.sav is renamed to X.c.

Similarly when a file, e.g. X.sav, is compiled via PL it is saved as X.o. When the compile operation is committed, the file X.o is renamed to X.obj.

Similarly when files are linked by PL the executable is saved as PROG.e. When the link operation is committed, the file PROG.e is renamed to PROG.exe.

Snapshots of the POT as events progress through the scenario will be shown. The format is a brief description of the event and the processing that takes place, followed by a snapshot of the POT.

1) The user starts the application. The table is created and initialized. All thread id's are obtained. Status set to IDLE.

| PO Name | Thread ID | Status |
|---------|-----------|--------|
| Save    | 101       | IDLE   |
| Compile | 102       | IDLE   |
| Link    | 103       | IDLE   |

2) The user makes changes to the source file A.c.

| PO Name | Thread ID | Status |
|---------|-----------|--------|
| Save    | 101       | IDLE   |
| Compile | 102       | IDLE   |
| Link    | 103       | IDLE   |

3) The user takes a break.
4) Predictive Compile starts saving file A into A.sav.

| PO Name | Thread ID | Status    |
|---------|-----------|-----------|
| Save    | 101       | EXECUTING |
| Compile | 102       | IDLE      |
| Link    | 103       | IDLE      |

5) Predictive Save finishes saving file A.

| PO Name | Thread ID | Status    |
|---------|-----------|-----------|
| Save    | 101       | COMPLETED |
| Compile | 102       | IDLE      |
| Link    | 103       | IDLE      |

6) Predictive Compile starts compiling file A.sav into a.o

| PO Name | Thread ID | Status    |
|---------|-----------|-----------|
| Save    | 101       | COMPLETED |
| Compile | 102       | EXECUTING |
| Link    | 103       | IDLE      |

7) Predictive Compile finishes compiling file A.sav

| PO Name | Thread ID | Status    |
|---------|-----------|-----------|
| Save    | 101       | COMPLETED |
| Compile | 102       | COMPLETED |
| Link    | 103       | IDLE      |

8) Predictive Link starts.

| PO Name | Thread ID | Status    |
|---------|-----------|-----------|
| Save    | 101       | COMPLETED |
| Compile | 102       | COMPLETED |
| Link    | 103       | EXECUTING |

9) The user is back to work (while the linker is running) making more changes to the source file.
10) Predictive link is suspended.

| PO Name | Thread ID | Status |
|---|---|---|
| Save | 101 | COMPLETED |
| Compile | 102 | COMPLETED |
| Link | 103 | SUSPENDED |

11) Since the new changes invalidated the PL save, compile and link work, that work is cancelled.

| PO Name | Thread ID | Status |
|---|---|---|
| Save | 101 | IDLE |
| Compile | 102 | IDLE |
| Link | 103 | IDLE |

12) The user make some more changes to the source file, saves the changes (manually) and takes another break.
13) Since there is nothing new to save, the save PO is not started.
14) Predictive Compile starts compiling file A.c into a.o

| PO Name | Thread ID | Status |
|---|---|---|
| Save | 101 | IDLE |
| Compile | 102 | EXECUTING |
| Link | 103 | IDLE |

15) Predictive Compile finishes compiling file A.c

| PO Name | Thread ID | Status |
|---|---|---|
| Save | 101 | IDLE |
| Compile | 102 | COMPLETED |
| Link | 103 | IDLE |

16) Predictive Link starts.

| PO Name | Thread ID | Status |
|---|---|---|
| Save | 101 | IDLE |
| Compile | 102 | COMPLETED |
| Link | 103 | EXECUTING |

17) The user is back to work (while the linker is running).

Realizing that the program is almost ready for another test, the user intends to compile the source file A.c link and test the application. The user requests a compilation of file A.
18) Predictive link is suspended.

| PO Name | Thread ID | Status |
|---|---|---|
| Save | 101 | IDLE |
| Compile | 102 | COMPLETED |
| Link | 103 | SUSPENDED |

19) Compilation of file A is committed and the user is notified that compilation is completed.

| PO Name | Thread ID | Status |
|---|---|---|
| Save | 101 | IDLE |
| Compile | 102 | IDLE |
| Link | 103 | SUSPENDED |

20) The user requests linking the application.

21) The link thread is resumed because compilation of A.c has not affected the link work.

| PO Name | Thread ID | Status |
|---|---|---|
| Save | 101 | IDLE |
| Compile | 102 | IDLE |
| Link | 103 | EXECUTING |

22) Linking is completed.

| PO Name | Thread ID | Status |
|---|---|---|
| Save | 101 | IDLE |
| Compile | 102 | IDLE |
| Link | 103 | COMPLETED |

23) Since the linking started before it was requested by the user it produced the executable PROG.e, but since the user requested it manually, the operation is automatically committed by renaming PROG.e to PROG.exe which is what the user expects to get as a result of linking.

| PO Name | Thread ID | Status |
|---|---|---|
| Save | 101 | IDLE |
| Compile | 102 | IDLE |
| Link | 103 | IDLE |

Using the foregoing specifications the invention may be implemented using standard programming and/or engineering techniques. If the invention is implemented in whole or part in software, the resulting program(s) may be stored on disk, diskettes, memory cards, ROM or any other memory device. For execution, the program may be copied into the RAM of the computer. One skilled in the art of computer science will easily be able to combine the software created as described with appropriate general purpose or special purpose computer hardware to create a computer system embodying the invention. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A method of operating a computer system comprising the steps of:

detecting, after a first predetermined period elapses since a user activity, the occurrence of a predetermined triggering event indicative that predicted operations are to be performed;

selecting a predicted operation to be performed which a user has not requested;

executing, during a period of user inactivity, the predicted operation;

storing results of the predicted operation with an uncommitted status; and changing the status of the results of the predicted operation to a committed status if the user resumes activity and requests the predicted operation; whereby the committed results become usable by the user as though generated after the user requests the predicted operation.

2. The method of claim 1, further comprising the step of invalidating or erasing the results of the predicted operation when the user enters a request or data which changes input data used by the predicted operation.

3. A method of operating a computer system comprising the steps of:

detecting after a first predetermined period elapses since a user activity, the occurrence of a predetermined triggering event indicative that predicted operations are to be performed;

selecting a predicted operation to be performed which a user has not requested;

executing, during a period of user inactivity, the predicted operation;

storing results of the predicted operation with an uncommitted status;

changing the status of the results of the predicted operation to a committed status if the user resumes activity and requests the predicted operation; whereby the committed results become usable by the user as though generated after the user requests the predicted operation; and suspending the execution of the predicted operation when the user enters a request which does not change input data for the predicted operation, then resuming execution of the predicted operation when a second predetermined time elapses since the user last entered a command.

4. A method of operation a computer system comprising the steps of:

detecting after a first predetermined period elapses since a user activity, the occurrence of a predetermined triggering event indicative that predicted operations are to be performed;

selecting a predicted operation to be performed which a user has not requested; wherein the step of selecting a predicted operation further comprises the step of choosing the predicted operation from a predicted operations table which contains a list of allowable predicted operations based on a status code for each allowable predicted operation and a priority code for each allowable predicted operation;

executing, during a period of user inactivity, the predicted operation;

storing results of the predicted operation with an uncommitted status; and changing the status of the results of the predicted operation to a committed status if the user resumes activity and requests the predicted operation; whereby the committed results become usable by the user as though generated after the user requests the predicted operation.

5. The method of claim 1, wherein the predetermined triggering event is the elapsing of the predetermined period since the user activity.

6. The method of claim 1 further comprising the steps of:

reading any user input, when the user resumes activity, which occurs during the execution of the predicted operation; and terminating, the execution of the predicted operation when the user input invalidates the results of the predicted operation by changing input data used by the predicted operation.

7. A method of operating a computer system comprising the steps of:

selecting, after a predetermined period elapses since a user activity, a predicted operation to be performed;

executing, during a period of user inactivity, the predicted operation;

storing results of the predicted operation identifies as predicted results; and presenting the predicted results to the user when the user requests the predicted operation.

8. The method of claim 7, further comprising the step of invalidating or erasing the predicted results when the user enters a request or data which changes input data used by the predicted operation.

9. A method of operating a computer system comprising the steps of:

selecting, after a predetermined period elapses since a user activity, a predicted operation to be performed;

executing, during a period of user inactivity, the predicted operation;

storing results of the predicted operation identified as predicted results;

presenting the predicted results to the user when the user requests the predicted operation; and suspending the execution of the predicted operation when the user enters a request, after resuming activity, which does not change input data for the predicted operation, then resuming execution of the predicted operation after a second predetermined period elapses since a second activity.

10. A method of operating a computer system comprising the steps of:

selecting, after a predetermined period elapses since a user activity, a predicted operation to be performed; wherein the step of selecting a predicted operation further comprises the step of choosing the predicted operation from a predicted operations table which contains a list of allowable predicted operations based on a status code for each allowable predicted operation and a priority code for each allowable predicted operation;

executing, during a period of user inactivity, the predicted operation;

storing results of the predicted operation identified as predicted results; and presenting the predicted results to the user when the user requests the predicted operation.

11. A method of operating a computer system comprising the steps of:
   waiting until a CPU utilization falls below a predetermined threshold;
   selecting, after a predetermined period elapses since a user activity, a predicted operation to be performed;
   executing, during a period of user inactivity, the predicted operation;
   storing results of the predicted operation identified as predicted results; and
   presenting the predicted results to the user when the user requests the predicted operation.

12. The method of claim 7 further comprising the steps of:
   reading any user input which occurs during the execution of the predicted operation; and
   terminating the execution of the predicted operation when the user input changes input data used by the predicted operation.

13. A computer system comprising:
   means for detecting the occurrence of a predetermined triggering event, after a predetermined period elapses since a user activity, indicative that predicted operations are to be performed;
   means for selecting a predicted operation to be performed which a user has not requested;
   means for executing, during a period of user inactivity, the predicted operation;
   means for storing results of the predicted operation with an uncommitted status; and
   means for changing the status of the results of the predicted operation to a committed status if the user requests the predicted operation; whereby the committed results become usable by the user as though generated after the user requests the predicted operation.

14. The system of claim 13, further comprising means for invalidating or erasing the results of the predicted operation when the user, after resuming activity, enters a request or data which changes input data used by the predicted operation.

15. A computer system comprising:
   means for detecting the occurrence of a predetermined triggering event, after a predetermined period elapses since a user activity, indicative that predicted operations are to be performed;
   means for selecting a predicted operation to be performed which a user has not requested;
   means for executing, during a period of user inactivity, the predicted operation;
   means for storing results of the predicted operation with an uncommitted status;
   means for changing the status of the results of the predicted operation to a committed status if the user requests the predicted operation; whereby the committed results become usable by the user as though generated after the user requests the predicted operation; and
   suspending the execution of the predicted operation when the user enters a request which does not change input data for the predicted operation, then resuming execution of the predicted operation when a second predetermined time elapses since a second user activity.

16. A computer system comprising:
   means for detecting the occurrence of a predetermined triggering event, after a predetermined period elapses since a user activity, indicative that predicted operations are to be performed;
   means for selecting a predicted operation to be performed which a user has not requested; wherein the means for selecting a predicted operation further comprises means for choosing the predicted operation from a predicted operations table which contains a list of allowable predicted operations based on a status code for each allowable predicted operation and a priority code for each allowable predicted operation;
   means for executing, during a period of user inactivity, the predicted operation;
   means for storing results of the predicted operation with an uncommitted status; and
   means for changing the status of the results of the predicted operation to a committed status if the user requests the predicted operation; whereby the committed results become usable by the user as though generated after the user requests the predicted operation.

17. The system of claim 13, wherein the predetermined triggering event is the elapsing of the predetermined period since the user activity.

18. A computer system comprising:
   means for detecting the occurrence of a CPU utilization falling below a predetermined threshold, after a predetermined period elapses since a user activity, indicative that predicted operations are to be performed;
   means for selecting a predicted operation to be performed which a user has not requested;
   means for executing, during a period of user inactivity, the predicted operation;
   means for storing results of the predicted operation with an uncommitted status;
   means for changing the status of the results of the predicted operation to a committed status if the user requests the predicted operation; whereby the committed results become usable by the user as though generated after the user requests the predicted operation.

19. The system of claim 13 further comprising:
   means for reading any user input which occurs during the execution of the predicted operation; and
   means for terminating the execution of the predicted operation when the user input changes data used by the predicted operation.

20. A method of operating a computer system comprising the steps of:
   detecting after a first predetermined period elapses since a user activity, the occurrence of a predetermined triggering event indicative that predicted operations are to be performed;
   selecting a predicted operation to be performed which a user has not requested;
   executing, during a period of user inactivity, the predicted operation;
   reading any user input, when the user resumes activity, which occurs during the execution of the predicted operation;
   suspending the execution of the predicted operation when the user input does not invalidate the results of the predicted operation, until the triggering event occurs, then resuming the execution of the predicted operation when the triggering event occurs again;
   storing results of the predicted operation with an uncommitted status; and changing the status of the results of the predicted operation to a committed status if the user resumes activity and requests the predicted operation; whereby the committed results become usable by the user as though generated after the user requests the predicted operation.

21. A method of operating a computer system comprising the steps of:

selecting, after a predetermined period elapses since a user activity, a predicted operation to be performed;

executing, during a period of user inactivity, the predicted operation;

reading any user input which occurs during the execution of the predicted operation; and suspending the execution of the predicted operation when the user input does not change input data used by the predicted operation, until the triggering event occurs, then resuming the execution of the predicted operation when predetermined time elapses since the user last entered a command or data;

storing results of the predicted operation identified as predicted results;

presenting the predicted results to the user when the user requests the predicted operation.

22. A method of operating a computer system comprising the steps of:

detecting after a first predetermined period elapses since a user activity, the occurrence of a predetermined triggering event indicative that predicted operations are to be performed;

selecting a compile operation to be performed which a user has not requested;

executing, during a period of user inactivity, the compile operation;

storing results of the compile operation with an uncommitted status;

changing the status of the results of the compile operation to a committed status if the user resumes activity and requests the compile operation; whereby the committed results become usable by the user as though generated after the user requests the compile operation.

23. A computer system comprising:

means for detecting the occurrence of a predetermined triggering event, after a predetermined period elapses since a user activity, indicative that predicted operations are to be performed;

means for selecting a compile operation to be performed which a user has not requested;

means for executing, during a period of user inactivity, the compile operation;

means for storing results of the compile operation with an uncommitted status;

means for changing the status of the results of the compile operation to a committed status if the user requests the predicted operation; whereby the committed results become usable by the user as though generated after the user requests the compile operation.

24. A computer program, stored on a memory medium, for causing a computer to perform the steps of:

selecting a predicted operation, which a user has not requested, to be performed after a predetermined period elapses since a user activity;

executing, during a period of user inactivity, the predicted operation;

storing results of the predicted operation with an uncommitted status; and changing the status of the results of the predicted operation to a committed status if the user resumes activity, without invalidating the results of the predicted operation, and requests the predicted operation.

25. A method of operating a computer system, the method comprising:

detecting that a first predetermined period has elapsed since a user activity last made changes to a file;

executing a save operation, which the user has not requested, whereby the execution of the save operation is initiated during a period of user inactivity;

storing results of the save operation with an uncommitted status; and changing the status of the results of the save operation to a committed status if the user resumes activity, without invalidating the results of the save operation, and requests the save operation.

26. A method of operating a computer system, the method comprising:

detecting that a first predetermined period has elapsed since a user activity edited a file;

executing a compile operation, which the user has not requested, whereby the execution of the compile operation is initiated during a period of user inactivity;

storing results of the compile operation with an uncommitted status; and changing the status of the results of the compile operation to a committed status if the user resumes activity without invalidating the results of the compile operation and requests the compile operation.

27. The method of claim 26 further comprising:

suspending the execution of the compile operation if the user resumes activity on the file; and aborting the execution of the compile operation if the resumed user activity invalidates the compile operation.

28. The method of claim 26 further comprising:

suspending the execution of the compile operation if the user resumes activity; and resuming the execution of the compile operation, during a second period of user inactivity, if the resumed user activity left the results of the compile operation unaffected.

29. A computer system comprising:

means for detecting that a first predetermined period has elapsed since a user activity last made changes to a file;

means for executing a save operation, which the user has not requested, whereby the execution of the save operation is initiated during a period of user inactivity;

means for storing results of the save operation with an uncommitted status; and means for changing the status of the results of the save operation to a committed status if the user resumes activity, without invalidating the results of the save operation, and requests the save operation.

30. A computer system comprising:

means for detecting that a first predetermined period has elapsed since a user activity edited a file;

means for executing a compile operation, which the user has not requested, whereby the execution of the compile operation is initiated during a period of user inactivity;

means for storing results of the compile operation with an uncommitted status; and means for changing the status of the results of the compile operation to a committed status if the user resumes activity without invalidating the results of the compile operation and requests the compile operation.

31. A computer program, on a memory medium, for causing a computer to perform the steps of:

detecting that a first predetermined period has elapsed since a user activity last made changes to a file;

executing a save operation, which the user has not requested, whereby the execution of the save operation is initiated during a period of user inactivity;

storing results of the save operation with an uncommitted status; and changing the status of the results of the save operation to a committed status if the user resumes activity, without invalidating the results of the save operation, and requests the save operation.

32. A computer program, on a memory medium, for causing a computer to perform the steps of:

detecting that a first predetermined period has elapsed since a user activity edited a file;

executing a compile operation, which the user has not requested, whereby the execution of the compile operation is initiated during a period of user inactivity;

storing results of the compile operation with an uncommitted status; and changing the status of the results of the compile operation to a committed status if the user resumes activity without invalidating the results of the compile operation and requests the compile operation.

* * * * *

UNITED STATES PATENT AND TRADEMARK OFFICE
CERTIFICATE OF CORRECTION

PATENT NO.    : 6,567,838 B1
DATED         : May 20, 2003
INVENTOR(S)   : Roni Korenshtein It is certified that error appears in the above-identified patent and that said Letters Patent is hereby corrected as shown below:

<u>Column 15,</u>
Line 49, delete "operation" and insert -- operating --

<u>Column 16,</u>
Line 24, delete "identifies" and insert -- identified --

Signed and Sealed this

Second Day of September, 2003

JAMES E. ROGAN
*Director of the United States Patent and Trademark Office*